Oct. 6, 1959 K. W. DOAK 2,907,756
STYRENE POLYMERIZATION PROCESS
Filed Feb. 3, 1958 2 Sheets-Sheet 1

INVENTOR.
KENNETH W. DOAK.
BY J.C. Armstrong
his ATTORNEY.

United States Patent Office 2,907,756
Patented Oct. 6, 1959

2,907,756

STYRENE POLYMERIZATION PROCESS

Kenneth W. Doak, Pittsburgh, Pa., assignor to Koppers Company, Inc., a corporation of Delaware Application February 3, 1958, Serial No. 712,840

4 Claims. (Cl. 260—93.5)

This invention relates to a method for the polymerization of vinyl aryl compounds. In one specific aspect, it relates to a new suspension polymerization technique for polymerizing styrene.

Styrene polymers having substantial amounts of residual monomer and low molecular weight polymer therein are generally characterized by high shrinkage in boiling water, low resistance to heat distortion, potential discoloration from oxidation of the monomer, and crazing by escape of volatile materials. For a long time workers in the field have tried to make substantially monomer-free (less than about 0.1% by weight) polystyrene of acceptable molecular weight range, not having the aforementioned undesirable characteristics. At present, a commercially desirable product has a relative viscosity of about 2.0 to 2.8 (which delineates the molecular weight range), a tensile strength of about 7000 to 9000 p.s.i., a notched impact strength of about 0.3–0.4 foot-lbs. per inch and a heat distortion temperature of about 195–202° C.

A process for making such a product is described in U.S. Patent No. 2,656,334, issued to Gaetano F. D'Alelio. By the D'Alelio process vinyl aryl compounds are polymerized by incorporating in the polymerizable mass a catalyst system consisting of a benzoyl peroxide plus at least one other organic peroxy compound of the class consisting of tertiary butyl perbenzoate, di-tertiary butyl perbenzoate, di-tertiary butyl di-perphthalate and 2,2-di-(tertiary-butyl-peroxy)-butane, heating the mass at a temperature between 25° C. and 95° C. until at least 60% conversion of the monomer to polymer occurs, and thereafter heating at a temperature between 100° C. and 150° C. until substantially complete polymerization occurs.

With respect to the benzoyl peroxide-tertiary butyl perbenzoate catalyst system, D'Alelio discloses that 0.006–0.198% by weight benzoyl peroxide and 0.0013–0.35% by weight tertiary-butyl perbenzoate may be used in combination. Using this catalyst system, D'Alelio found it necessary to polymerize at temperatures below 95° C. until at least 60% of the conversion of monomer to polymer occurs to prevent coalescence of the globules of monomer or polymer and formation of considerable amounts of low molecular weight material. After 60% conversion is reached, a second heating stage at temperatures of 100–150° C. is used to complete the polymerization. With this two-stage process, suspension polymerization of styrene can be accomplished in 9½ to 10½ hours (actual polymerization time). Surprisingly enough, I have discovered that by controlling the rate of free radical formation during the polymerization I have been able to polymerize styrene at a markedly increased rate and still obtain a commercially desirable product.

It is, therefore, an object of the present invention to provide a new method for polymerizing styrene, whereby commercially desirable styrene polymer is produced and at the same time the polymerization time required is reduced by about 45%.

In accordance with the present invention, I am able to produce a commercial product in a considerably shorter time than has been heretofore possible by increasing the rate of polymerization and concomitantly controlling the concentration of free radicals at all times during polymerization. The rate of polymerization is increased by operating at higher polymerization temperatures obtained by a gradual increase in the temperature of the system. The concentration of free radicals is controlled by selecting a catalyst initiator combination that will permit a slight increase in the concentration of free radicals as the temperature increases and polymerization progresses.

It is helpful in understanding my invention to keep in mind the following theoretical considerations.

If styrene contains peroxide initiator (I), at any given degree of conversion and temperature, free radicals (R·) are formed in the system. The free radicals progressively add styrene units, thus initiating the growth of polymer chains according to the following equation:

(1) $$R\cdot + S \rightarrow RS\cdot$$

wherein:

R· is the free radical concentration, and
S represents a styrene molecule.

The rate at which free radicals are formed, or the rate of initiation, is determined by Equation 2:

(2) $$R_i = k_i(I)$$

wherein:

$R_i$ is the rate of initiation,
$k_i$ is the rate constant for initiation of a polymer chain, and
(I) is the concentration of initiator.

The rate at which styrene is polymerized is shown in Equation 3:

(3) $$R_p = k_p(R\cdot)(S)$$

wherein:

$R_p$ is the rate of polymerization,
$k_p$ is the rate constant for polymerization or propagation of a polymer chain,
(R·) is the free radical concentration, and
(S) is the concentration of styrene monomer.

The rate at which growing polymer radicals react to terminate the growth of chains is shown below in Equation 4:

(4) $$R_t = 2k_t(R\cdot)^2$$

wherein:

$R_t$ is the rate of termination,
$k_t$ is the rate constant for termination of polymer chains, and
$(R\cdot)$ is the free radical concentration.

It is apparent from the above equations that the rate of polymerization is influenced by the rates of initiation, propagation and termination of the individual polymer chains. At a low degree of conversion of monomer to polymer, wherein conditions approach the steady state, the rates of initiation and termination are substantially equal. Assuming this, Equation 2 can be substituted into Equation 4 as follows:

(5) $$k_i(I) = 2k_t(R\cdot)^2$$

or $$(R\cdot) = \sqrt{\frac{k_i}{2k_t}}\sqrt{(I)}$$

Substituting Equation 5 into Equation 3 gives:

(6) $$R_p = k_p\sqrt{\frac{k_i}{2k_t}}(S)\sqrt{(I)}$$

Thus, the rate of polymerization at low conversions is proportional to the square root of the initiator concentration.

The degree of polymerization (or molecular weight) is equal to the rate of propagation divided by the rate of termination. Dividing Equation 3 by Equation 4 gives:

(7) $$\bar{P} = \frac{k_p(S)}{2k_t(R\cdot)}$$

wherein $\bar{P}$ is the degree of polymerization.

Thus, the degree of polymerization (or molecular weight) is inversely proportional to the free radical concentration. Substituting Equation 5 into Equation 7 gives:

(8) $$\bar{P} = \frac{k_p(S)}{\sqrt{2k_tk_i}}\sqrt{(I)}$$

The degree of polymerization at any temperature is, therefore, inversely proportional to the square root of the initiator concentration. It is also apparent from Equation 8 that the degree of polymerization is dependent upon the relative values of the three rate constants. Each rate constant varies logarithmically with temperature according to the relationship shown in Equation 9.

(9) $$k = Ae^{-E/RT}$$

wherein:

E is the activation energy,
R is the rate,
T is the absolute temperature, and
A is an entropy term.

Thus, Equation 7 can be written as follows:

(10) $$\bar{P} = \frac{(S)A_pe^{-E_p/RT}}{2(R\cdot)A_te^{-E_t/RT}}$$

wherein the subscripts "p" and "t" refer to the propagation and termination of a polymer chain, respectively.

Equation 10 can be written logarithmically as shown below.

(11) $$\ln\bar{P} = \frac{\ln(S)A_p}{2(R\cdot)A_t} + \frac{1}{RT}(-E_p + E_t)$$

If the concentrations of styrene and of free radicals are held constant Equation 11 can be written as shown in Equation 12.

(12) $$\ln\bar{P} = \frac{C_5 - C_6}{RT}$$

By actual physical measurements, the value $C_5-C_6$ is negative. Differentiating gives:

(13) $$d\ln\bar{P} = \frac{+C_6}{RT^2}$$

The temperature coefficient thus becomes positive and the degree of polymerization $\bar{P}$ increases as the temperature is increased. Similarly, it can be shown from Equation 8 that the degree of polymerization decreases as the temperature increases if the initiator concentration is held constant.

From the foregoing theoretical considerations it can be seen that (1) at any conversion or temperature, if the concentration of initiator is held constant and the temperature is increased, the rate of polymerization increases and the molecular weight decreases, and (2) if the concentration of free radicals is held constant and the temperature is increased, the rate of polymerization increases less rapidly as the temperature increases, but the molecular weight increases. I have found that by controlling the rate of formation of free radicals, either by varying the concentration of the initiator or by choosing an initiator with the proper rate of decomposition, to permit a slight increase in the free radical concentration as the temperature increases, the rate of polymerization can be increased while the molecular weight remains substantially constant. By a "slight" increase I mean the increase in free radical concentration necessary to produce a product having a relative viscosity of 2.0 to 2.8, as determined by the solubility of a 1% solution in toluene at 30° C. My invention can be more clearly understood with reference to the accompanying drawings, wherein:

Figure 3:
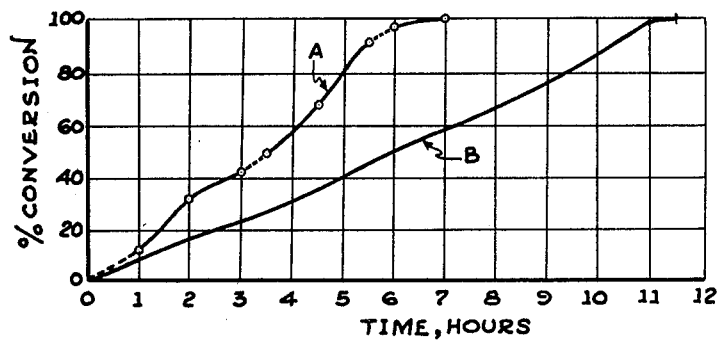

Figure 3 shows the percent conversion of monomer to polymer plotted as a function of time. Curve A of Figure 3 shows conversion versus time for a typical polymerization using the process of the present invention. Curve B shows conversion versus time for a typical polymerization using the process of D'Alelio, U.S. 2,656,334.

Figure 1:
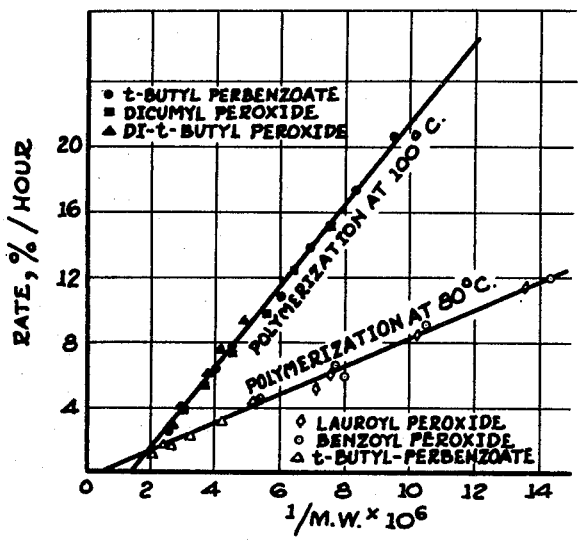
Figure 1 shows the rate of polymerization obtained using various initiator systems (i.e. lauroyl peroxide, benzoyl peroxide, and t-butyl perbenzoate) at temperatures of 80° C. and 100° C. plotted as a function of the reciprocal of the molecular weight.

Referring now to Figure 1, it can be observed that at both 80 and 100° C. the rate of polymerization of styrene in the presence of peroxides is a linear function of the reciprocal of the molecular weight. At either temperature the results obtained using three different peroxides fall on the same straight line, showing that the only difference in behavior between various peroxides is their rate of free radical formation, i.e. their rate of decomposition. The slopes of the curves of Figure 1 are proportional to the term $k_p^2/k_t$ in which $k_p$ and $k_t$ are the rate constants for chain propagation and chain termination, respectively. It is readily seen that if the rate of free radical formation is properly controlled, the rate of polymerization at 100° C. can be increased by a factor of approximately 2.7 over that at 80° C. (the difference in slope between the two curves) without reducing the molecular weight of the polymer. The change in slope from 80° to 100° C. is a result of the increase in the term $k_p^2/k_t$, which shows that the rate of chain propagation is influenced more by temperatures than is the rate of chain termination. The data on which Figure I are based are shown hereunder in Table I.

Table 1

POLYMERIZATION AT 80° C. USING VARIOUS INITIATORS (I)

| Parts I | $\sqrt{(I)}$ | Hours | Percent Conv. | Rate, percent Hr. | Mol. Wt. $\times 10^{-3}$ | $\dfrac{10^5}{\text{Mol. Wt.}}$ |
|---|---|---|---|---|---|---|
| t-Butyl Perbenzoate | | | | | | |
| .111 | .333 | 7.00 | 8.36 | 1.19 | 485 | 206 |
| .222 | .471 | 4.17 | 7.03 | 1.69 | 430 | 233 |
| .222 | .471 | 6.00 | 9.54 | 1.59 | 400 | 250 |
| .464 | .681 | 4.00 | 9.33 | 2.34 | 317 | 316 |
| .853 | .923 | 4.00 | 12.65 | 3.19 | 240 | 417 |
| 1.186 | 1.089 | 3.17 | 11.78 | 3.77 | 215 | 465 |
| 1.898 | 1.378 | 3.17 | 14.25 | 4.59 | 190 | 526 |
| Lauroyl Peroxide | | | | | | |
| 0.050 | 0.223 | 2.62 | 9.61 | 3.68 | 210 | 476 |
| .110 | .332 | 2.62 | 14.5 | 5.54 | 140 | 715 |
| .227 | .477 | 2.15 | 18.4 | 8.58 | 97 | 1030 |
| .440 | .664 | 2.15 | 24.7 | 11.5 | 74 | 1350 |
| .102 | .320 | 1.87 | 11.8 | 6.3 | 132 | 758 |
| Benzoyl Peroxide | | | | | | |
| 0.111 | 0.333 | 1.42 | 9.48 | 6.63 | 128 | 782 |
| .111 | .333 | 2.92 | 17.45 | 5.97 | 125 | 800 |
| .056 | .236 | 2.92 | 13.02 | 4.45 | 185 | 541 |
| .219 | .468 | 1.42 | 13.10 | 9.24 | 95 | 1052 |
| .370 | .608 | 1.42 | 16.85 | 12.00 | 70 | 1430 |

POLYMERIZATION AT 100° C. USING VARIOUS INITIATORS (I)

| Pts. Peroxide | $\sqrt{(I)}$ | Hours | Percent Conv. | Rate, Percent Hr. | Mol. Wt. $\times 10^{-3}$ | $\dfrac{10^5}{\text{Mol. Wt.}}$ |
|---|---|---|---|---|---|---|
| t-Butyl Perbenzoate | | | | | | |
| ----- | ----- | 1.75 | 4.34 | 2.48 | 400 | 250 |
| 0.040 | 0.200 | 1.75 | 8.18 | 4.67 | 305 | 328 |
| 0.082 | 0.286 | 1.75 | 11.33 | 6.47 | 250 | 400 |
| 0.119 | 0.345 | 1.50 | 11.56 | 7.71 | 225 | 445 |
| 0.241 | 0.491 | 1.50 | 15.87 | 10.58 | 167 | 599 |
| 0.398 | 0.631 | 1.50 | 20.98 | 13.99 | 142 | 704 |
| 0.563 | 0.750 | 1.25 | 21.29 | 17.03 | 120 | 831 |
| 0.802 | 0.896 | 1.25 | 25.65 | 20.52 | 105 | 953 |
| Dicumyl Peroxide | | | | | | |
| ----- | ----- | 3.00 | 6.65 | 2.22 | 430 | 233 |
| 0.113 | 0.336 | 3.00 | 12.09 | 4.03 | 330 | 303 |
| 0.218 | 0.467 | 3.00 | 15.51 | 5.17 | 285 | 351 |
| 0.433 | 0.658 | 3.00 | 22.49 | 7.50 | 225 | 445 |
| 0.733 | 0.856 | 3.00 | 28.61 | 9.54 | 180 | 555 |
| 1.197 | 1.094 | 2.00 | 24.55 | 12.28 | 155 | 645 |
| 1.741 | 1.320 | 2.00 | 30.03 | 15.02 | 133 | 752 |
| t-Butyl Peroxide | | | | | | |
| 0.038 | 0.195 | 3.17 | 8.85 | 2.79 | 385 | 260 |
| 0.088 | 0.297 | 5.17 | 16.12 | 3.12 | 360 | 278 |
| 0.212 | 0.460 | 3.17 | 13.09 | 4.13 | 345 | 290 |
| 0.210 | 0.458 | 5.17 | 21.39 | 4.14 | 345 | 290 |
| 0.320 | 0.566 | 3.17 | 15.97 | 5.04 | 310 | 323 |
| 0.547 | 0.740 | 3.17 | 19.78 | 6.24 | 270 | 370 |
| 0.835 | 0.914 | 2.00 | 15.11 | 7.56 | 240 | 416 |
| 1.204 | 1.097 | 2.00 | 18.29 | 9.15 | 210 | 475 |

The method of my invention is especially applicable to suspension polymerization systems. In suspension polymerization styrene monomer is admixed with water and a minor portion of a stabilizer or suspending agent such as tricalcium phosphate. The methods of preparing the suspensions, and various suitable suspending agents, are described in U.S. Patents 2,687,408 and 2,715,118 issued to J. M. Grim.

In addition to the stabilizing agent, the use of a small quantity (e.g. 0.001 to 0.05% by weight of total charge) of a surface-active agent to reduce surface tension is often helpful. Any nonionic, anionic or cationic surfactant material is acceptable for this purpose. Alkyl aryl sulfonates and octylphenoxy polyether alcohols are quite suitable.

The concentration of free radicals present at any time during polymerization may be controlled by either incremental addition of free radicals (e.g. in the form of organic peroxides that will decompose as the temperature is increased) to the system as polymerization progresses or by adding a predetermined quantity of a balanced initiator system before beginning the polymerization reaction.

Using the incremental addition technique, it is necessary to add all of the initiator before polymerization has progressed to such an extent that intimate mixing of catalyst and styrene monomer is precluded. Generally speaking, I am able to add incremental amounts of organic peroxide to the system until a temperature of about 115° C. is reached. The amount of catalyst and the choice of catalyst are predicated on the desired molecular weight and the temperature at which the catalyst is added to the system. These requirements are determined by curves similar to those of Figure 1 of the drawings. At lower temperatures (100° C.) free radicals are supplied to the system using a major portion of an initiator having a decomposition temperature in this same range, e.g. benzoyl peroxide. As polymerization continues and temperatures approaching 115° C. are reached, an initiator with a higher decomposition temperature, e.g. tertiary-butyl perbenzoate, is added to the system in predominant amounts. The total amount of catalyst added during incremental addition comprises 0.07–0.11% low temperature initiator and 0.11–0.07% high temperature initiator, the percentages being based upon the weight of styrene monomer.

In another embodiment of the invention, I have found that the concentration of free radicals present in the system at a given time can be controlled by adding initially a balanced catalyst combination comprising two different peroxide initiators, wherein one of the catalysts chosen has a higher decomposition temperature than the other. A preferred balanced catalyst system comprises 0.07–0.11% benzoyl peroxide and 0.11–0.07% tertiary-butyl perbenzoate. The percentages of the catalyst represent percent by weight of styrene monomer initially present in the system. Particularly good results are obtained using .09% benzoyl peroxide and .09% tertiary-butyl perbenzoate.

In controlling the rate of polymerization and the concomitant rate of free radical formation, the time-temperature cycle for polymerization is of paramount importance. After forming the stabilized suspension comprising styrene and admixing therewith a predetermined amount of the balanced organic peroxide initiator system, polymerization is accomplished as follows:

The mass is heated to a temperature of about 100° C. in about 0.8–1.2 hours and is maintained at that temperature for about 1.8–2.2 hours. Thereafter, the mass is heated to a temperature of about 115° C. in about 0.4–0.6 hours and is maintained at that temperature for about 1.8–2.2 hours. The mass is then heated to a temperature of about 135° C. in about 0.4–0.8 hours. At this point polymerization is substantially completed. Any residual monomer is removed by continuing polymerization at 135° C. for up to about one hour. Often only about one-fourth hour heating time at this temperature is required to complete the polymerization. During the heating step the pressure in the reactor increases from about atmospheric to a maximum of about 35 p.s.i.g.

Figure 2:
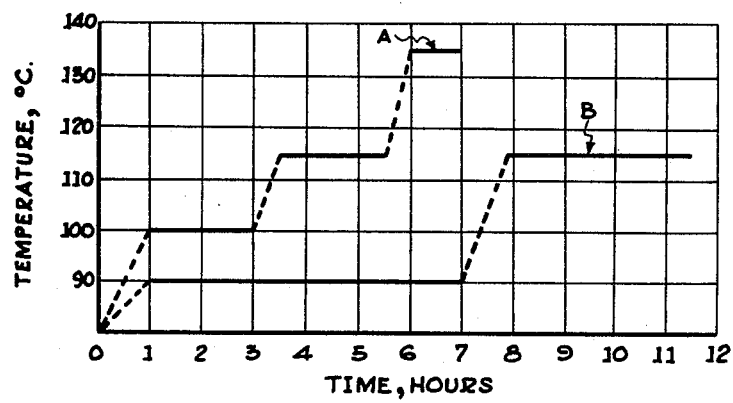
Figure 2 shows temperature of polymerization plotted as a function of time for a typical process of the present invention (curve A) and the process of D'Alelio, U.S. Patent 2,656,334 (curve B).

Figure 2 illustrates a preferred embodiment of the heating cycle of the present invention and compares that cycle with a conventional prior art process. In Figure 2 (Curve A) the polymerizable mass is heated to 100° C. in an hour, maintained at that temperature for two hours, heated to 115° C. in one-half hour, maintained at that temperature for two hours, heated to 135° C. in one-half hour and maintained at that temperature for one hour. It is interesting to contrast that cycle with that of Curve B of Figure 2, which represents the process of D'Alelio, hereinbefore described. It is readily seen that, disregarding the time required to obtain a particular temperature level, the total polymerization time at the various temperature levels is reduced from 9½ to five hours using the process of the present invention. The same heating cycle is used for both the initial ind incremental method of catalyst addition.

Figure 3 shows the percentage conversion of monomer to polymer as a function of time. Curve A of Figure 3 was plotted from the data shown hereunder in Table II.

Table II

Time-temperature level: Percent conversion
Hours at 100° C.—
0 ............................................ 12
1 ............................................ 32
2 ............................................ 42
Hours at 115° C.—
0 ............................................ 49
1 ............................................ 68
2 ............................................ 92
Hours at 135° C.—
0 ............................................ 98

Curve B shows the same relationship using the process of D'Alelio. It is interesting to note that using the D'Alelio process it was necesary to achieve 60% conversion before raising the temperature above 95° C. Using the process of the present invention the temperature can be raised to 100° C. after only about 12% conversion is achieved.

After polymerization is completed, the beads thus obtained are washed by adding 37% HCl solution to the polymerized mass, centrifuging, and thereafter washing with water. The beads are then dried at a temperature of about 70° C. for about 2 hours.

Using my novel process the relative viscosity of a 1% solution of the product in toluene at 30° C. at low conversion is approximately 1.45–1.60; at the end of the reaction the viscosity is increased to 2.0–2.8. The heat distortion temperature and other essential physical characteristics of the product are substantially identical with those of the products obtained using the D'Alelio process.

The method of my invention is also applicable in preparing plasticized or lubricated polymers, using such plasticizers as butyl Cellosolve stearate or butyl stearate. While these particular plasticizers are especially useful in preparing commercially desirable products, my novel method is by no means limited thereto. Any of the plasticizers described in D'Alelio, U.S. 2,656,334 are suitable for my purpose.

My invention is further illustrated by the following examples.

EXAMPLE I

One hundred gallons of a stabilized aqueous suspension of styrene monomer were prepared by admixing 55 parts by weight styrene and 45 parts by weight water. A catalyst composition comprising 0.09% benzoyl peroxide and 0.09% tertiary-butyl perbenzoate, (said percentages being based upon the weight of styrene monomer) was added thereto. The suspension was stabilized by adding 0.45% (based on the weight of total charge) tricalcium phosphate and 0.002% (based on the weight of total charge) Nacconal NRSF, a commercially available alkyl aryl sulfonate. The suspension was transferred to a reactor equipped with an agitator and was heated to a temperature at 100° C. in one hour and maintained at that temperature for an additional two hours. Thereafter, the suspended mass was heated to 115° C. in one-half hour and maintained at that temperature for one hour. The temperature was then raised to 135° C. in one-half hour. After an additional one hour of heating at that temperature the polymerization was substantially complete. The polymer beads thus obtained were washed first with HCl and then with water. They were dried at 70° C. for about two hours. Table III hereunder shows pertinent physical and chemical properties of the dried product.

Table III

| Property | Test Method Used | Result |
|---|---|---|
| Residual Monomer, percent | Dissolve sample of polymerized mass in CHCl₃; measure U.V. absorption of polystyrene. | <0.1 |
| Relative Viscosity | Solubility of a 1% solution in toluene at 30° C. | 2.343 |
| Tensile Strength, p.s.i. | ASTM-D 638-56T | 9,170 |
| Tensile Elastic Modulus, p.s.i. ×10⁻³. | ASTM-D 638-56T | 447 |
| Elongation, percent | ASTM-D 638-56T | 4.2 |
| Notched Impact Strength, ft.-lb./in. | ASTM-D-256-56 | 0.3 |
| Heat Distortion Temperature, °F. | ASTM-D-648-56 | 200 |

EXAMPLE II

The procedure of Example I was substantially repeated with the exceptions that 2.04% by weight (based on the weight of styrene monomer) of butyl Cellosolve stearate was added to the suspension before polymerization, and the heating cycle was modified by heating to 135° C. in 0.8 hour (rather than ½ hour) and stopping the polymerization at that point.

The properties of the product thus obtained are shown below in Table IV.

Table IV

| Property | Test Method Used | Result |
|---|---|---|
| Residual Monomer, percent | Dissolve sample of polymerized mass in CHCl₃; measure U.V. absorption of polystyrene. | 0.3 |
| Relative Viscosity | Solubility of a 1% solution in toluene at 30° C. | 2.270 |
| Tensile Strength, p.s.i. | ASTM-D 638-56T | 7,510 |
| Tensile Elastic Modulus, p.s.i. ×10⁻³. | ASTM-D 638-56T | 427 |
| Elongation, percent | ASTM-D 638-56T | 2.3 |
| Notched Impact Strength, ft.-lb./in. | ASTM-D-256-56 | 0.4 |
| Heat Distortion Temperature, °F. | ASTM-D-648-56 | 179 |

EXAMPLE III

One hundred gallons of a polymerizable styrene suspension were prepared according to the procedure of Example I using 55 parts by weight styrene and 45 parts by weight water. To this suspended mass were added 0.2024% benzoyl peroxide, 0.04286% tertiary-butyl perbenzoate, 0.2333% tricalcium phosphate, and 0.0015% Nacconal NRSF. Polymerization was conducted in a reactor equipped with an agitator according to the following cycle. The mass was heated to 88° C. in 1.5 hours. The temperature was thereafter raised to 92° C. in one-half hour and maintained at that level for 5.8 hours. The temperature was then raised to 115° C. in 0.8 of an hour and maintained for 3.4 hours. The beads thus obtained were washed and dried according to the procedure of Example I.

The properties of the resulting product are shown below in Table V.

Table V

| Property | Test Method Used | Result |
|---|---|---|
| Residual Monomer, percent | Dissolve sample of polymerized mass in CHCl₃; measure U.V. absorption of polystyrene. | 0.08 |
| Relative Viscosity | Solubility of a 1% solution in toluene at 30° C. | 2.4–2.7 |
| Tensile Strength, p.s.i. | ASTM-D 638-56T | 9,000 |
| Tensile Elastic Modulus, p.s.i.×10⁻³. | ASTM-D 638-56T | 500 |
| Elongation, % | ASTM-D 638-56T | 1.5 |
| Notched Impact Strength, ft.-lb./in. | ASTM-D-256-56 | 0.3 |
| Heat Distortion Temperature, °F. | ASTM-D-648-56 | 201 |

It is readily seen that a product prepared by the process of the present invention (see Table III, Example I) and a product prepared by the process of D'Alelio (see Table V, Example III) are substantially comparable in their physical characteristics.

I have thus provided a novel, commercially operable method for styrene polymerization having a considerably reduced polymerization time. The reduction of the polymerization cycle makes possible a substantial increase in plant output, thus reducing the overall equipment cost per pound of polystyrene product.

I claim:

1. Method of polymerizing styrene comprising forming a stablized aqueous suspension containing styrene as a sole polymerizable monomer, intimately admixing therewith a catalyst combination consisting of 0.07–0.11% t-butyl perbenzoate and 0.11–07% benzoyl peroxide, said percentages being based on the weight of styrene monomer in the suspended mass, heating the catalyst-containing mass to a temperature of about 100° C. in about an hour and maintaining that temperateur for about two hours, thereafter heating said catalyst-containing mass to a temperature of about 115° C. in about one-half hour and maintaining that temperature for about two hours, and thereafter heating said catalyst-containing mass to a temperature of about 135° C. in about one-half hour and maintaining that temperature for up to about one hour, whereby the free radical concentration of said catalyst-containing mass is permitted to increase only by a very slight amount during the successive heating stages and substantially complete polymerization is effected during the final heating stage.

2. Method according to claim 1 wherein 0.1 to 5% by weight of a plasticizer is incorporated into the suspension.

3. Method of polymerizing styrene comprising forming an aqueous suspension containing styrene as a sole polymerizable monomer, controlling the free radical concentration therein throughout polymerization by admixing with the suspended mass a catalyst combination consisting of 0.07–0.11% t-butyl perbenzoate and 0.07–0.11% benzoyl peroxide, said percentages being based on the weight of styrene monomer in said suspended mass, heating the catalyst-containing mass to a temperature of about 100° C. in about 0.8–1.2 hours and maintaining that temperature for about 1.8–2.2 hours, thereafter heating said catalyst-containing mass to a temperature of about 115° C. in about 0.4–0.6 hour and maintaining that temperature for about 1.8–2.2 hours, and thereafter heating said catalyst-containing mass to a temperature of about 135° C. in about 0.4–0.8 hour and maintaining that temperature for up to about one hour, whereby the free radical concentration of said catalyst-containing mass is permitted to increase only by a very slight amount during the successive heating stages and substantially complete polymerization is effected during the final heating stage.

4. Method according to claim 3 wherein said catalyst combination is admixed incrementally with said suspended mass until a temperature of about 115° C. is reached.

References Cited in the file of this patent

UNITED STATES PATENTS

| | | |
|---|---|---|
| 2,456,558 | Glick | Dec. 14, 1948 |
| 2,521,754 | Shusman | Sept. 12, 1950 |
| 2,656,334 | D'Alelio | Oct. 20, 1953 |